United States Patent [19]

Rice

[11] Patent Number: 5,203,918

[45] Date of Patent: Apr. 20, 1993

[54] METHOD FOR FORMING AGGREGATED KAOLIN PIGMENT

[75] Inventor: C. Arlyn Rice, Sandersville, Ga.

[73] Assignee: ECC America Inc., Atlanta, Ga.

[21] Appl. No.: 927,235

[22] Filed: Aug. 7, 1992

Related U.S. Application Data

[63] Continuation of Ser. No. 534,123, Jun. 4, 1990, abandoned.

[51] Int. Cl.⁵ .............................................. C04B 14/04
[52] U.S. Cl. ................................... 106/486; 162/181.8
[58] Field of Search ....................... 106/486, 468, 416; 162/181.8; 501/145

[56] References Cited

U.S. PATENT DOCUMENTS

| | | |
|---|---|---|
| 2,296,637 | 9/1942 | Hanahan . |
| 2,296,639 | 9/1942 | Hanahan . |
| 3,765,825 | 10/1973 | Hurst . |
| 3,769,383 | 10/1973 | Hurst . |
| 3,849,149 | 11/1974 | Drummond et al. . |
| 4,026,721 | 5/1977 | Kurrle . |
| 4,117,191 | 9/1978 | Kurrle ........................... 162/181.8 X |
| 4,182,785 | 1/1980 | Price ............................... 106/488 X |
| 4,241,142 | 12/1980 | Kaliski et al. .................... 106/486 X |
| 4,381,948 | 5/1983 | McConnell et al. . |
| 4,499,062 | 2/1985 | Christophliemk et al. . |
| 4,812,299 | 3/1989 | Wason . |
| 4,816,074 | 3/1989 | Raythatha et al. ............. 106/486 X |
| 4,818,294 | 4/1989 | Raythatha et al. . |
| 4,826,536 | 5/1989 | Raythatha et al. ............. 106/468 X |

OTHER PUBLICATIONS

Sax, N. Irving et al. "Hawley's Condensed Chemical Dictionary" 1987, p. 49.

*Primary Examiner*—Mark L. Bell
*Assistant Examiner*—Paul Marcantoni
*Attorney, Agent, or Firm*—Klauber & Jackson

[57] ABSTRACT

A method for forming an aggregated kaolin clay pigment, comprising: preparing an aqueous 6–30% solids slurry of a fine particle size feed kaolin kaolin; intermixing with said slurry from about 10 to 20% of alum, by weight of the dry kaolin; adding to the mix of step (b) from about 15 to 30% of sodium silicate, by weight of the dry kaolin; mixing the reactants of step (c); and filtering and drying the slurry to recover aggregates of adherent platelets.

7 Claims, 2 Drawing Sheets

PARTICLE SIZE DISTRIBUTION

METHOD FOR FORMING AGGREGATED KAOLIN PIGMENT

This application is a continuation of application Ser. No. 07/534,123, filed Jun. 4, 1990, now abandoned.

FIELD OF THE INVENTION

This invention relates to a method for preparing aggregated pigments from kaolin clays by chemical aggregation at substantially ambient, i.e. room temperature. The resulting aggregated pigments display high porosity compared to the feed clay, rendering them highly useful in paper filling and coating compositions.

BACKGROUND OF THE INVENTION

Hydrothermal treatment of kaolin clays to produce modified products of various types, has been known for many years, and is widely described in the prior art technical and patent literature. The reaction of sodium silicate with kaolin clays, for example, has been studied under various hydrothermal conditions, as reported by Kurbus et al, Z. Anogr. Allg. Chem., 1977, Volume 429, pages 156–161. These reactions were studied under hydrothermal conditions using essentially equivalent molar ratios of the kaolin and sodium silicate with the reaction being carried out in an autoclave. The products of the reactions, as identified by x-ray, electron microscope, and infrared methods, showed that sodium silicate reacts with kaolin to form an alumino-silica gel or a crystallized zeolite mineral analcime of the formula:

$Na_2O:Al_2O_3:4SiO_2 2H_2O$

In the reaction, the kaolin dissolves and alpha-quartz simultaneously appears in the product of reaction.

U.S. Pat. No. 4,812,299 issued Mar. 14, 1989 to S.K. Wason (assigned to J.M. Huber Corp.) describes compositions designated as synthetic alkali metal aluminosilicates, or simply SAMS, prepared by the hydrothermal reaction of an alkali metal silicate and kaolin clay. By the term "hydrothermal" it is meant that the reaction is carried out under aqueous conditions of elevated temperatures and pressures of greater than atmospheric. The reaction is conducted under conditions of agitation. In a preferred operation of the said process, the aqueous slurry of the starting clay material and the alkali metal silicate is formed, the system is closed and heat applied to gradually raise the temperature. In general, the pressure in the system will range from about 50 to 360 psig at temperatures ranging from about 140 to 250 degrees C. A specifically preferred range of conditions is to operate the process at pressures of 100 to 200 psig and temperatures of 164° to 194° degrees C. The temperatures are preferably correlated to the pressure such as that provided by steam. The reaction time is about 0.25 to 4 hours. After completion of the reaction, heat is removed and the mixture is allowed to cool, after which the system is opened, the product separated by filtration or centrifugation, washed with water, and dried. Spray drying is preferred at inlet temperatures of 1000° F. (538° C.) and outlet temperature of 250° F. (121° C ). The products are defined as structured agglomerates wherein the primary particles comprise altered kaolin clay platelets integrated with one or more adjacent areas of essentially amorphous alkali metal silicate base-kaolin clay reaction products. More specifically, they are described as altered kaolin platelets having an integrated rimmed area of amorphous, non-diffracting alkali metal silicate-kaolin reaction product. The products are said to be useful as reinforcing agents or fillers for papers, paints, plastics and rubber and to have increased opacity and brightness as compared with the starting clay material.

U.S. Pat. No. 4,816,074 issued Mar. 28, 1989 to Rasik H. Raythatha et al, assigned to E.C.C. America Inc., describes a non-hydrothermal process in which a structured aggregated kaolin pigment is prepared by mixing substantially dry kaolin in particulate form with an aqueous alkali metal silicate to deposit on the surface of the kaolin particles a substantially molecular level of said silicate without formation of silica gel, drying the treated kaolin without calcination and exposing it to an acidic gas. The product is useful as a pigment in the coating or filling of paper. The process serves to aggregate the very fine particles (i.e. the sub 0.25 micrometer particles) present in very fine feeds. Thus, the otherwise large percentages of troublesome extremely fine particles are effectively removed as separate entities, but without the need for separation steps, together with the costly equipment required for such operations.

U.S. Pat. No. 3,765,825 issued Oct. 16, 1973 to V.J. Hurst teaches reducing the viscosity of kaolin clay slurries by hydrothermal treatment. In U.S. Pat. No. 3,769,383 issued Oct. 30, 1973, he teaches hydrothermal treatment of kaolin to produce a variety of alumino-silicate products.

U.S. Pat. No. 4,499,062 issued Feb. 12, 1985 to P. Christophliemk et al (assigned to Henkel) teaches hydrothermal decomposition of industrial waste products such as filter sludge containing aluminum silicate and/or alkali aluminum silicate, by addition of aqueous NaOH solution and sand.

In pending patent application Ser. No. 416,936 of Dunaway et al. filed Oct. 4, 1989, which application is assigned to the assignee of the instant application, there is disclosed a method which enables relatively low temperature aggregation of kaolin, which can be hydrothermal. In the practice of the Dunaway invention an aqueous slurry of particulate kaolin clay and sodium aluminate is prepared, having a total solids concentration of from about 2 to 25% by weight, the weight ratio between kaolin and aluminate being greater than 1. The slurry is then treated in a closed system to form aggregates of adherent kaolin platelets. The treatment is generally effected at temperatures of from about 50° to 300° C., with a more preferable temperature being in the range of from about 90° to 200° C. Pressure conditions in the closed system correspond to saturated steam at the temperature utilized. The slurry is subjected to mixing during the hydrothermal treatment, with such treatment being carried out for from about 0.1 to 8 hours; and preferably for from about 0.1 to 2 hours. In a further aspect of the Dunaway et al invention, it has been found that generally lower temperatures can be used during the hydrothermal reaction, where the slurry further includes sodium silicate. Where so used, the molar ratio between the sodium aluminate (expressed as equivalent $Al_2O_3$) and sodium silicate (expressed as equivalent $SiO_2$) is from about 1:2 to 2:1. Following the hydrothermal reaction, the resultant aggregates are recovered and dried. Wide varieties of clays can be processed including inferior, low grade clays which may be unsuitable for calcination. Discolored clays having low brightnesses can also be used as feed for the process, and unexpectedly brightened pigments are thereby yielded.

In Swift, U.S. Pat. No. 3,849,149, a method is disclosed for coating mineral particles which can include alumino silicates. The purpose of the coating on the mineral particles is to render the surface acidic so that the coating materials enter into a polymerization reaction with basic organic materials. Since the objective is not aggregation, the quantity of additives is relatively low, and it is important that the particles remain separate so that each particle can be coated in the subsequent polymerization reaction.

In Hanahan, U.S. Pat. No. 2,296,637, a high-surface hiding pigment material and process of making same is disclosed. In one aspect of the method of preparation, a sodium silicate solution is added to a clay pigment slurry and is precipitated upon the clay surface by creating an acid environment such as by adding sulfuric acid.

In Hanahan, U.S. Pat. No, 2,296,639, similar materials to those described in the 2,296,637 patent are precipitated, especially upon lithopone. The patent also indicates that the process can be used with other extender materials such as aluminum silicates. The reaction product formed can be that of sodium silicate and aluminum sulfate. The preferred amounts are very low (0.35%–1.5% silicate). Percentages higher than 10% are said by the patentee to result in decreased surface hiding power when the pigments are used in paints.

In Kurrle, U.S. Pat. No. 4,026,721, a composite silicate pigment is prepared by a precipitation reaction wherein spherical hydrous metal silicate particles are precipitated on the planar surfaces of clay particles having a platelet-type structure. An aqueous suspension of the clay pigment is formed, and a water soluble salt of an alkaline earth metal is blended into the clay slurry. Under high shear, a water soluble alkali metal silicate is then metered into the slurry to precipitate the alkaline earth metal silicate (preferably calcium silicate) in the form of spherical particles on the clay platelets. The composite pigment is then filtered and washed. The clay component may comprise kaolinite. The small spherical particles on the clay platelets are stated by the patentee to not significantly alter the overall particle size distribution of the base material.

In accordance with the foregoing, it may be regarded as an object of the present invention to provide a process for aggregating a kaolin feed, which process can be effectively practiced at substantially room temperature (and pressure) and which result in an aggregated pigment displaying good brightness and high pore volume, thereby rendering such pigment highly suitable for paper coating and paper filling applications.

SUMMARY OF THE INVENTION

Now in accordance with the present invention, it has been found that a fine particle size kaolin can be aggregated at a low pH by acid-induced polymerization with alum (aluminum sulfate) and sodium silicate. The desired reaction takes place at room temperature and at a low pH, in the range of about 3.5 to 5.0 and preferably below about 4.0. However, higher temperatures can be utilized without detrimentally affecting the product quality. The preferable feed utilized in preparing the aggregates is a kaolin which has a particle size distribution wherein substantially all particles are, below 2 micrometers in equivalent spherical diameter (ESD), and the average particle size in the feed is below one micrometer. A preferable feed has an average particle size below 0 5 μm. So-called cream kaolins or grey kaolins can be effectively aggregated by the method of the invention. The degree of aggregation can be monitored by the change in the subquarter micron fraction. In accordance with the invention this fraction is reduced by at least 50%. This subsequent decrease in the sub-quarter micrometer fraction is accompanied by a corresponding increase in pore volume. The product has a typically pore volume of at least 0.55 $cm^3/g$.

It is preferable that the kaolin feed has prior thereto been processed without the use of organic dispersants. Sodium silicate/alum content (i.e. the sum of the two additives) in the reaction mix may range from about 20% to 50% by weight and preferably is in the range of from about 25 to 40% by weight on a dry basis. The ratio of Si/Al can range from 1–2. Where the product of the invention is used as a coating pigment in preparation of coated papers, the resulting paper products show excellent improvements in sheet brightness, sheet gloss, dry/litho print gloss and smoothness as compared to a conventional heat aggregated or prior art aggregated coating pigments. The products are similarly useful in the filling of papers.

DESCRIPTION OF PREFERRED EMBODIMENTS

In a typical procedure in accordance with the invention, an aqueous 6–30% solids slurry of a fine particle size feed kaolin is prepared. The slurry is intermixed with from about 10 to 20% of alum, by weight of the dry kaolin. From about 15 to 30% of sodium silicate, by weight of the dry kaolin is then added to the mix. The reactants are mixed for 5 to 10 minutes and slurry is filtered and dried to recover aggregates of adherent platelets.

Practice of the present invention will now be illustrated by examples, which are deemed illustrative of both the process taught by the present invention and of the products yielded in accordance with the invention:

EXAMPLE 1

A 40 gram sample of kaolin having a particle size distribution such that about 97 by weight is less than 1 micrometer ESD was slurried at 10% solids in 160 grams of water. To this solution was added 8 grams of alum. The pH of the solution was about 3.8. 90 grams of a 10% sodium silicate solution was added with vigorous stirring. The resulting reaction mixture contained 30% by weight of the sodium silicate/alum additives. The mixture was stirred for ten minutes, filtered and dried, by oven drying at 100° C. Spray drying was also used on other samples.

EXAMPLE 2

The above procedure was repeated. In this instance the sodium silicate/alum addition was to the extent of about 12.5% by weight on a dry basis in the reaction mixture.

EXAMPLE 3

The procedures of Example 1 and 2 were repeated, using 22.5% by weight of the sodium silicate/alum additives.

EXAMPLE 4

The products of Examples 2-3 were redispersed at 10% solids and blended for two minutes in a Waring blendor. Particle size, surface area and pore volume measurements were made on the products before and after blending, with the object of determining if the aggregate strengths could withstand the paper making process. Of interest was whether the aggregates could withstand the type of agitation occurring in paper making, and were sufficiently resistant to break up by resolublization of the silicate polymer. The results are shown in Table 1 below.

TABLE 1

Alum/Na Silicate Low Temperature/
Low pH Aggregation Using a Beneficiated Fine
Particle Size Gray Kaolin

| % Na Silicate/Alum | G.E. Brightness[1] | Surace Area | Mercury Porosimetry cm³/g | Average PSD μm |
|---|---|---|---|---|
| 0% (control) | 78.0 | 24.0 | 0.39 | 0.25 |
| 12.5% | | | | |
| as reacted | 78.0 | 32.8 | 0.58 | 1.3 |
| after redispersion | 78.1 | 32.8 | 0.54 | 1.0 |
| 22.5% | | | | |
| as reacted | 78.9 | 30.5 | 0.60 | 0.98 |
| after redispersion | 78.4 | 34.5 | 0.54 | 0.97 |

[1]TAPPI Procedure T-646, OS-75

[1]TAPPI Procedure T-646 OS-75

Figure 1:
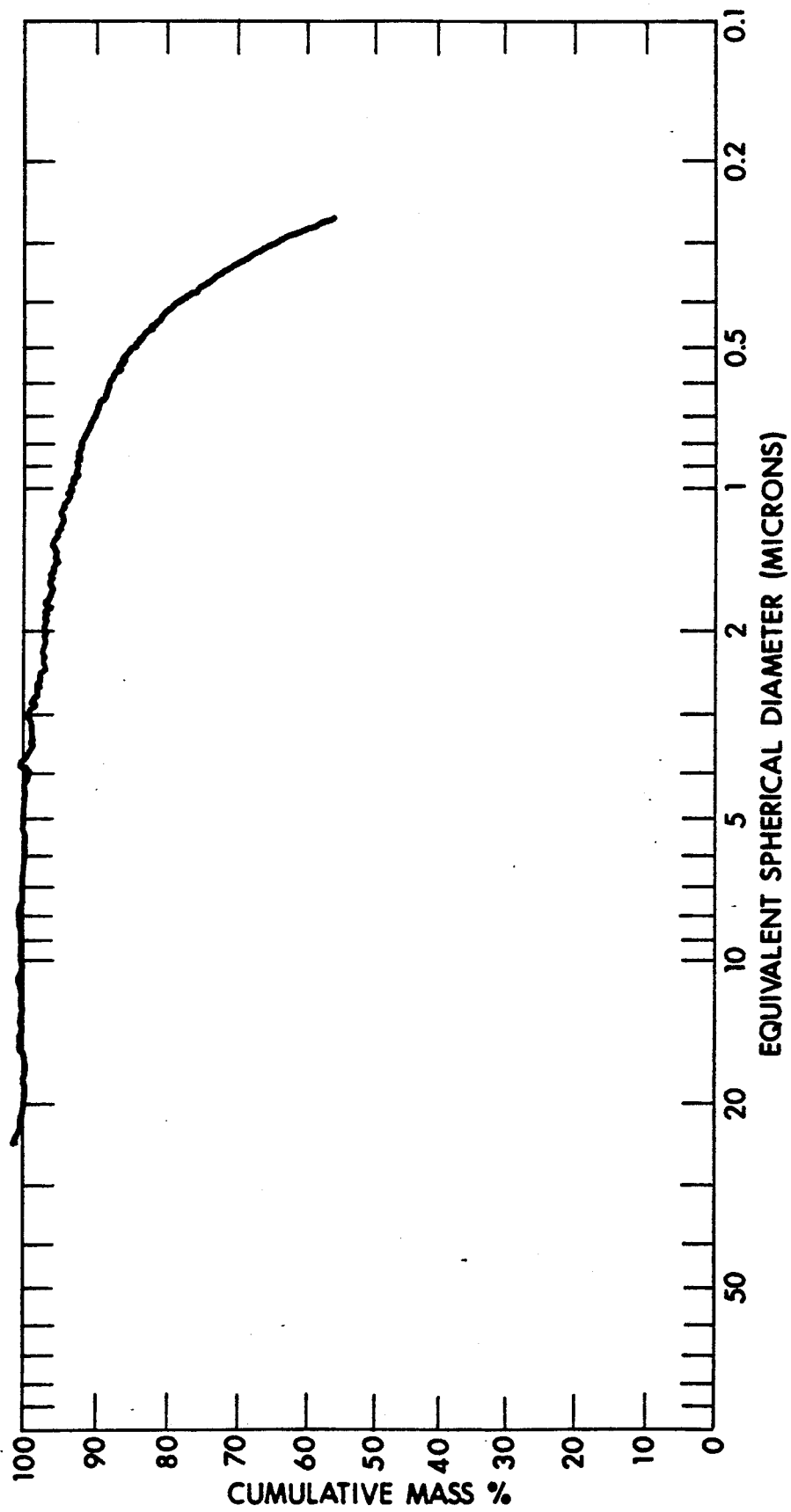
In FIG. 1 a PSD curve appears from a feed kaolin used in a process of the invention.
Figure 2:
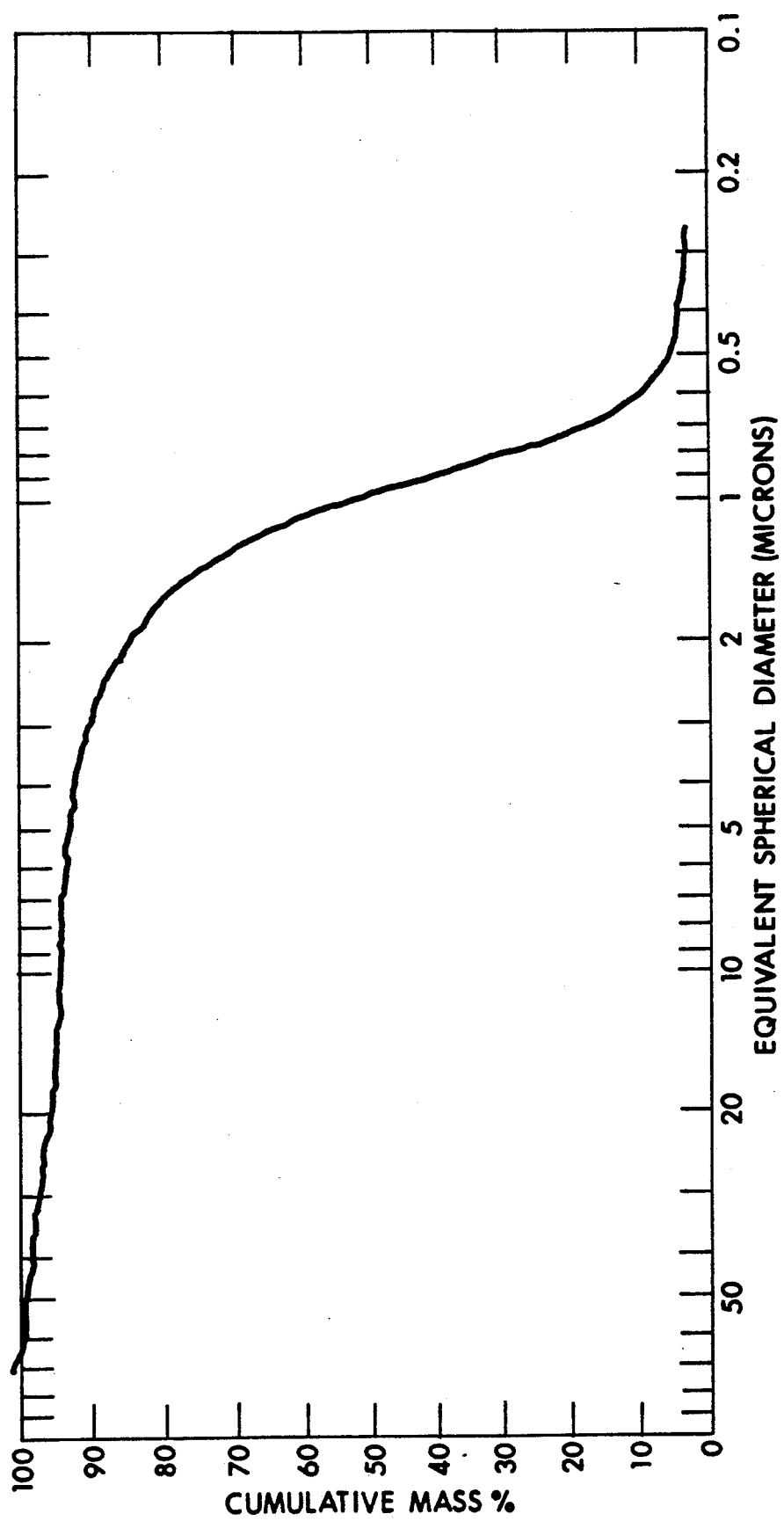
FIG. 2 is a PSD curve from the product yielded by aggregation of the feed shown in FIG. 1.

In Table 1 characteristics of the resulting pigments are set forth with respect to brightness, surface area, mercury porosimetry and average particle size. It is seen from Table 1 that there was no change in the particle size distribution curve of the 22.5% or the 12.5% sodium silicate/alum aggregated product with blending in a Waring blendor at 10% solids for two minutes. In FIGS. 1 and 2 PSD curves appear for the feed kaolin and the resulting aggregated product. This illustrates the significant aggregation achieved by the invention.

The product of the Example was evaluated in a sulfide paper system for scatter properties and compared with the product produced via the Kurrle, U.S. Pat. No. 4,026,721 cited above. The 22.5% sodium silicate/alum products show an appreciable increase in comparison to the product produced by the methodology of U.S. Pat. No. 4,026,721, i.e. 523 v. 577, with a reduced level of additives.

TABLE 2

10% Normalized Scatter[2] in a Sulfide Paper System

| | | |
|---|---|---|
| Product of the Invention (Example 3) | 577 | Feed from Example 1 Treated with 22.5% Na Silicate/alum at room temperature |
| Product of U.S. Pat. No. 4,026,721 | 523 | Feed from Example 1 treated with 40% CaCl₂/Na Silicate at room temperature |

[2]See U.S. Pat. No. 4,818,294

[2]See U.S. Pat. No. 4,818,294

EXAMPLE 5

To demonstrate that a high degree of aggregation occurs with a wide variety of feed materials, several different feed kaolins and blends were aggregated by the method described in Example 3. The results are set forth in Table 3 below:

TABLE 3

| Feed Materials | % sub 0.25μ Content Before Reaction | After Aggregating |
|---|---|---|
| A Platey South Carolina Hard Kaolin | 68 | 5 |
| B Grey Washington County GA. (WC) Kaolin | 63 | 4 |
| Cream WK Kaolin | 63 | 0 |
| Delaminated Sand Ground WC Cream Kaolin | 17 | 1 |
| Blend of A and B | 65 | 3 |

EXAMPLE 6

The aggregated product described in Example 3 was evaluated in a low weight coating offset application. This room temperature aggregate was utilized at 40 parts replacement in a 50/50 KCS ®/Alphaplate ® pigmented coating formulation and compared to 40 parts Deltagloss ® replacement, or 10 parts Alphatex ® replacement in the same 50/50 KCS ®/Alphaplate ® pigmented coating formula. Deltagloss is described in U.S. Pat. No. 4,818,294. Alphatex ® is described in U.S. Pat. No. 4,381,948. Alphaplate ® is a delaminated kaolin product of ECCA, having an average particle size of about 0.5 μm. KCS ® is a No. 2 coating clay. The evaluation data is listed in Table 4. It can be seen from the data that the product of this invention outperformed the other pigment systems in sheet brightness, sheet gloss, dry/litho printgloss, and smoothness.[3]

[3]Hollingsworth, Jones, Bonny, The Effect of Calcined clays on the Printability of Coated Rotogravure and Offset Printing Papers, Tappi Proceedings, page 9-16, 1983 Coating Conference.

TABLE 4

| Sample: | 50 ALPHAPLATE ® 50 KCS ® | 45 ALPHAPLATE ® 45 KCS ® - 10 ALPHATEX ® | 30 ALPHAPLATE ® 30 KCS ® 40 DELTAGLOSS ® | 30 ALPHAPLATE ® 30 KCS ® 40 Product of Invention |
|---|---|---|---|---|
| Brightness, ISO | 66.3 | 67.3 | 66.8 | 68.0 |
| Opacity, Printing | 93.1 | 93.4 | 93.3 | 93.7 |
| Gloss | 56.0 | 56.5 | 60.7 | 62.5 |
| Hunter L | 85.14 | 85.55 | 85.36 | 85.69 |
| a | 0.27 | 0.28 | 0.21 | 0.28 |
| b | 5.73 | 5.32 | 5.57 | 4.94 |
| Print Gloss | 74.0 | 74.3 | 75.0 | 77.6 |
| Litho Print Gloss | 71.6 | 73.0 | 72.6 | 75.9 |
| Delta Print Gloss | 18.0 | 17.8 | 14.3 | 15.1 |

TABLE 4-continued

| Sample: | Parts by Weight | | | |
| --- | --- | --- | --- | --- |
| | 50 ALPHAPLATE ®<br>50 KCS ® | 45 ALPHAPLATE ®<br>45 KCS ®<br>10 ALPHATEX ® | 30 ALPHAPLATE ®<br>30 KCS ®<br>40 DELTAGLOSS ® | 30 ALPHAPLATE ®<br>30 KCS ®<br>40 Product of<br>Invention |
| Print Density | 1.51 | 1.47 | 1.47 | 1.49 |
| Litho Print Density | 1.48 | 1.46 | 1.44 | 1.48 |
| Print Density Ratio | 0.98 | 0.99 | 0.98 | 0.99 |
| Dry Pick, VVP | 28.4 | 24.3 | 25.2 | 25.8 |
| Parker Print Surf:<br>Roughness, Microns<br>Backing S10 | 1.02 | 0.97 | 0.94 | 0.92 |
| Paperscape<br>au2 (128) | 4.96 | 5.04 | 5.17 | 3.85 |
| Bulk | 0.65 | 0.62 | 0.72 | 0.84 |

While the present invention has been particularly set forth in terms of specific embodiments thereof it will understood in view of the instant disclosure that numerous variations upon the invention are now enabled to those skil in the art, which variations yet reside within the scope of the present teaching. Accordingly, the invention is to be broadly construed and limited only by the scope and spirit the claims now appended hereto.

What is claimed is:

1. A method for forming an aggregated kaolin clay pigment, consisting essentially of:
   (a) preparing an aqueous 6–30% solids slurry of a fine particle size feed kaolin;
   (b) intermixing with said slurry from about 10 to 20% of alum, by weight of the dry kaolin;
   (c) adding to the mix of step (b) from about 15 to 30% of sodium silicate, by weight of the dry kaolin;
   (d) mixing the reactants of step (c); and
   (e) filtering and drying the slurry to recover aggregates of adherent kaolin platelets;
   the steps (b), (c) and (d) being carried out at a pH in the range of from about 3.5 to 5.0.

2. A method in accordance with claim 1, wherein the feed kaolin has a PSD such that from 95 to 100% by weight thereof are of less than one micrometer ESD.

3. A method in accordance with claim 1, wherein said feed kaolin is a grey kaolin.

4. A method in accordance with claim 1, wherein said feed is a cream kaolin.

5. A method in accordance with claim 1, wherein at least a 50% reduction in the sub-¼ micrometer content of the feed kaolin is effected.

6. A method in accordance with claim 1, wherein at least a 25% increase in pore volume of the feed kaolin is effected.

7. The aggregated kaolin clay product produced by the process of claim 1, and having a pore volume greater than 0.55 cm$^3$/g and a PSD such that no greater than 10% by weight are <10 micrometers.

* * * * *